(12) United States Patent
Kawana et al.

(10) Patent No.: US 8,413,203 B2
(45) Date of Patent: Apr. 2, 2013

(54) PROGRAM RECORDING AND PLAYING APPARATUS AND PORTABLE TERMINAL FOR RECORDING AND PLAYING PROGRAMS

(75) Inventors: Koichi Kawana, Chiba (JP); Yoko Takahashi, Kanagawa (JP); Makoto Korehisa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1278 days.

(21) Appl. No.: 09/929,780

(22) Filed: Aug. 14, 2001

(65) Prior Publication Data

US 2002/0023266 A1 Feb. 21, 2002

(30) Foreign Application Priority Data

Aug. 16, 2000 (JP) ................................ P2000-246795

(51) Int. Cl.
*H04N 7/173* (2011.01)
(52) U.S. Cl. ........... 725/131; 725/39; 725/141; 725/153
(58) Field of Classification Search .................... 725/80, 725/82, 133, 141, 153, 62, 81, 83, 39–61, 725/131, 139, 151; 348/734
See application file for complete search history.

(56) References Cited

U.S. PATENT DOCUMENTS

| | | | |
|---|---|---|---|
| 5,945,988 A | | 8/1999 | Williams et al. |
| 5,963,624 A * | | 10/1999 | Pope ........................ 379/110.01 |
| 6,075,812 A | | 6/2000 | Cafarella et al. |
| 6,130,726 A * | | 10/2000 | Darbee et al. ................. 348/734 |
| 6,175,860 B1 * | | 1/2001 | Gaucher ........................ 709/208 |
| 6,195,548 B1 * | | 2/2001 | Schultheiss .................... 455/419 |
| 6,314,285 B1 * | | 11/2001 | Isberg et al. ................... 455/418 |
| 6,405,049 B2 * | | 6/2002 | Herrod et al. ................. 455/517 |
| 6,501,516 B1 * | | 12/2002 | Clapper ........................ 348/734 |
| 6,556,822 B1 * | | 4/2003 | Matsumoto .................... 455/421 |
| 6,567,984 B1 * | | 5/2003 | Allport ........................ 725/110 |
| 6,594,498 B1 * | | 7/2003 | McKenna et al. ............. 455/517 |
| 6,601,074 B1 * | | 7/2003 | Liebenow .................. 707/104.1 |
| 6,735,619 B1 * | | 5/2004 | Sawada ......................... 709/212 |
| 6,748,278 B1 * | | 6/2004 | Maymudes ..................... 700/17 |
| 6,799,209 B1 * | | 9/2004 | Hayton ......................... 709/223 |
| 6,870,570 B1 * | | 3/2005 | Bowser ......................... 348/552 |
| 7,275,255 B2 * | | 9/2007 | Suda et al. ..................... 725/80 |
| 2001/0021998 A1 * | | 9/2001 | Margulis ......................... 725/81 |
| 2005/0028208 A1 * | | 2/2005 | Ellis et al. ....................... 725/58 |
| 2005/0251836 A1 * | | 11/2005 | Young et al. .................... 725/89 |

FOREIGN PATENT DOCUMENTS

| | | |
|---|---|---|
| DE | 197 37 651 | 5/1999 |
| GB | 2 343 074 | 4/2000 |
| JP | 10 290484 | 10/1998 |
| JP | 2000 69381 | 3/2000 |
| JP | 2000-115655 | 4/2000 |
| JP | 2000 201338 | 7/2000 |
| WO | WO 99 04561 | 1/1999 |
| WO | WO 00 04709 | 1/2000 |

* cited by examiner

*Primary Examiner* — Farzana Hossain
(74) *Attorney, Agent, or Firm* — Frommer Lawrence & Haug LLP; William S. Frommer (57) ABSTRACT

A broadcast program recording and playing apparatus includes a program management unit that manages a database storing program information for broadcast programs. A transmission unit transmits the program information stored in the database to an electronic apparatus using wireless communication. Under the control of the electronic apparatus, a control unit controls an apparatus having functions of recording and playing the broadcast programs.

16 Claims, 7 Drawing Sheets

PROGRAM RECORDING AND PLAYING APPARATUS AND PORTABLE TERMINAL FOR RECORDING AND PLAYING PROGRAMS

This application claims a priority to Japanese Application No. 2000-246795 filed on Aug. 16, 2000, the entirety of which is incorporate herein by reference.

BACKGROUND OF THE INVENTION

1. Field of the Invention

The present invention relates to broadcast program recording and playing apparatuses and to portable terminals for recording and playing broadcast programs. More particularly, the present invention relates to a broadcast program recording and playing apparatus and to a portable terminal for recording and playing broadcast programs in which, on the premise that program information transmitted by the Internet or digital broadcasting is stored beforehand in a database and hence the program information is extractable, the program information is displayed on the portable terminal for each individual, and an audiovisual apparatus is controlled in accordance with the displayed information, thereby selectively playing and programming program recording by selecting the title of a program.

2. Description of the Related Art

An environment in which program recording can be set up using an electronic program guide (EPG) on the Internet has been developed. For example, an iEPG (internet EPG) system is proposed by the same applicant as the present invention. The iEPG system is developed for a recording system referred to as Giga Pocket (trademark of Sony Corporation), which sets up program recording using a program guide site on the Internet. The iEPG system is offered as an Internet TV guide. In this recording system, a user browses a list of programs and selects a recording button of a program that the user wants to set up for recording, thereby downloading a text file in which the broadcast station name, program title, start time, and end time are described. In this system, program recording is set up based on various downloaded data. As a result, recordings can be set up only by on-screen operations on the Web.

Also, there are other products, such as a personal television "Replay TV" and a personal video recorder (PVR) as typified by TiVo, Inc., which can automatically set up recordings using program information based on personal preferences. What Replay TV offers is one service referred to as personal television. Using Replay TV, a user can record a currently-broadcast television program to the user's hard disk drive (HDD) in real time, and, while watching the program, the user can pause and rewind the program. Also, the user can get a program guide and select favorite programs according to actor, theme, and the like. Hence, the user can collect favorite programs into a personal channel on the HDD.

Although the service offered by PVRs is similar to that using video cassette recorders (VCRs), PVRs are advantageous to VCRs in that PVRs can record programs for hours using a large-capacity hard disk instead of a tape. Since real-time program recording can be performed by a PVR, a PVR user can skip commercials and enjoy the program using pause and rewind functions. Also, the PVR user can select dozens of programs to set up for recording.

Although the above-described service based on the Internet TV guide only enables a user to set up recordings and to download program information, the service does not enable the user to extract program information based on user's personal preferences. In light of extraction of program information based on the user's personal preferences, conventional recordings by VCRs and the above-described recordings based on the Internet TV guide only differ in that the former uses a remote control and that the latter uses a personal computer (PC) to set up recording. In essence, neither recording system can set up recordings unless the user intends to set up recordings. In the future era of digital broadcasting and multiple channels, the user may miss more and more programs unless careful attention is given to program information.

Although the service using Replay TV and PVRs enables each user to set up recordings based on the user's personal preferences, the centralized management of a plurality of individuals' program information cannot be performed because each apparatus is independent.

SUMMARY OF THE INVENTION

Accordingly, it is an object of the present invention to provide, on the premise that broadcast programs and information for the broadcast programs transmitted by the Internet or digital broadcasting are stored beforehand in a predetermined storage device and hence the program information is extractable, technology to easily select desired broadcast program information based on personal preferences, to play and set up recordings of desired programs, and to perform the centralized management of a plurality of individuals' personal program information.

In order to achieve the foregoing objects, according to an aspect of the present invention, a broadcast program recording and playing apparatus is provided including a program management unit for managing a database that stores program information for broadcast programs; a transmission unit for transmitting the program information stored in the database to an electronic apparatus using wireless communication; and a control unit for controlling, under the control of the electronic apparatus, an apparatus having functions of recording and playing broadcast programs.

The electronic apparatus may include a portable terminal.

The portable terminal may include a private apparatus.

The apparatus having functions of recording and playing broadcast programs may include an audio apparatus or a video apparatus.

The wireless communication may be based on a spread spectrum communication system.

The wireless communication with the electronic apparatus may be switched between communication using a public circuit and short-distance wireless communication.

The short-distance wireless communication may be based on the Bluetooth system.

The short-distance wireless communication may be based on an infrared data communication system.

According to another aspect of the present invention, a portable terminal for recording and playing broadcast programs is provided including a transmission unit for transmitting program information stored in a database that stores the program information for broadcast programs to an electronic apparatus using wireless communication; a display unit for displaying the program information obtained using the transmission unit; and a command transmission unit for transmitting a command that controls an apparatus having functions of recording and playing broadcast programs to a server that controls recording and playing performed by the apparatus.

The electronic apparatus may include the portable terminal itself.

The portable terminal may include a private apparatus.

The apparatus having functions of recording and playing broadcast programs may include an audio apparatus or a video apparatus.

The wireless communication may be based on a spread spectrum communication system.

The wireless communication with the electronic apparatus may be switched between communication using a public circuit and short-distance wireless communication.

The short-distance wireless communication may be based on the Bluetooth system.

The short-distance wireless communication may be based on an infrared data communication system.

According to the present invention, on the premise that program information transmitted by the Internet or digital broadcasting is stored beforehand in a database and hence the program information is extractable, the program information is displayed on a portable terminal, such as a cellular phone or a personal digital assistant (PDA), for each individual, and hence an audiovisual apparatus is controlled in accordance with the displayed information. By simply selecting the program title, it is possible to play a program regardless of the storage location of the program. It is also possible to set up recording of a program by selecting the program title, and hence it becomes unnecessary to perform complicated setting of the audiovisual apparatus. Furthermore, it is possible to set up recording of a program from indoors or from outside by installing a device that can establish a wireless link with a cellular phone or a PDA using wireless communication using a public circuit or short-distance wireless communication such as Bluetooth, wireless LAN, and infrared data communication (IrDA).

According to the present invention, a home server stores an individual's broadcast program information and controls all of the home appliances connected thereto. A user only needs to use a portable terminal to call-up broadcast program information stored in a database and to select desired broadcast program information. It thus becomes unnecessary to perform complicated setting of audiovisual apparatuses which perform playing and recording of broadcast programs. The portable terminal can operate the audiovisual apparatuses remotely using wireless communication. Also, the portable terminal can establish a link with the home server from the outside through a network such as a public circuit and can gain access to the home server. As a result, the portable terminal can set up recordings regardless of the location of the portable terminal. The home server performs centralized management of individuals' broadcast program information. If necessary, program information in accordance with personal preferences is displayed for each individual. Unnecessary information is not displayed, and hence desired information can be selected efficiently. As a result, the power consumption of the portable terminal is reduced.

DESCRIPTION OF THE PREFERRED EMBODIMENTS

With reference to the accompanying drawings, the present invention will become apparent from the following description of the preferred embodiments of a broadcast program recording and playing apparatus and a portable terminal for recording and playing broadcast programs.

Figure 1:
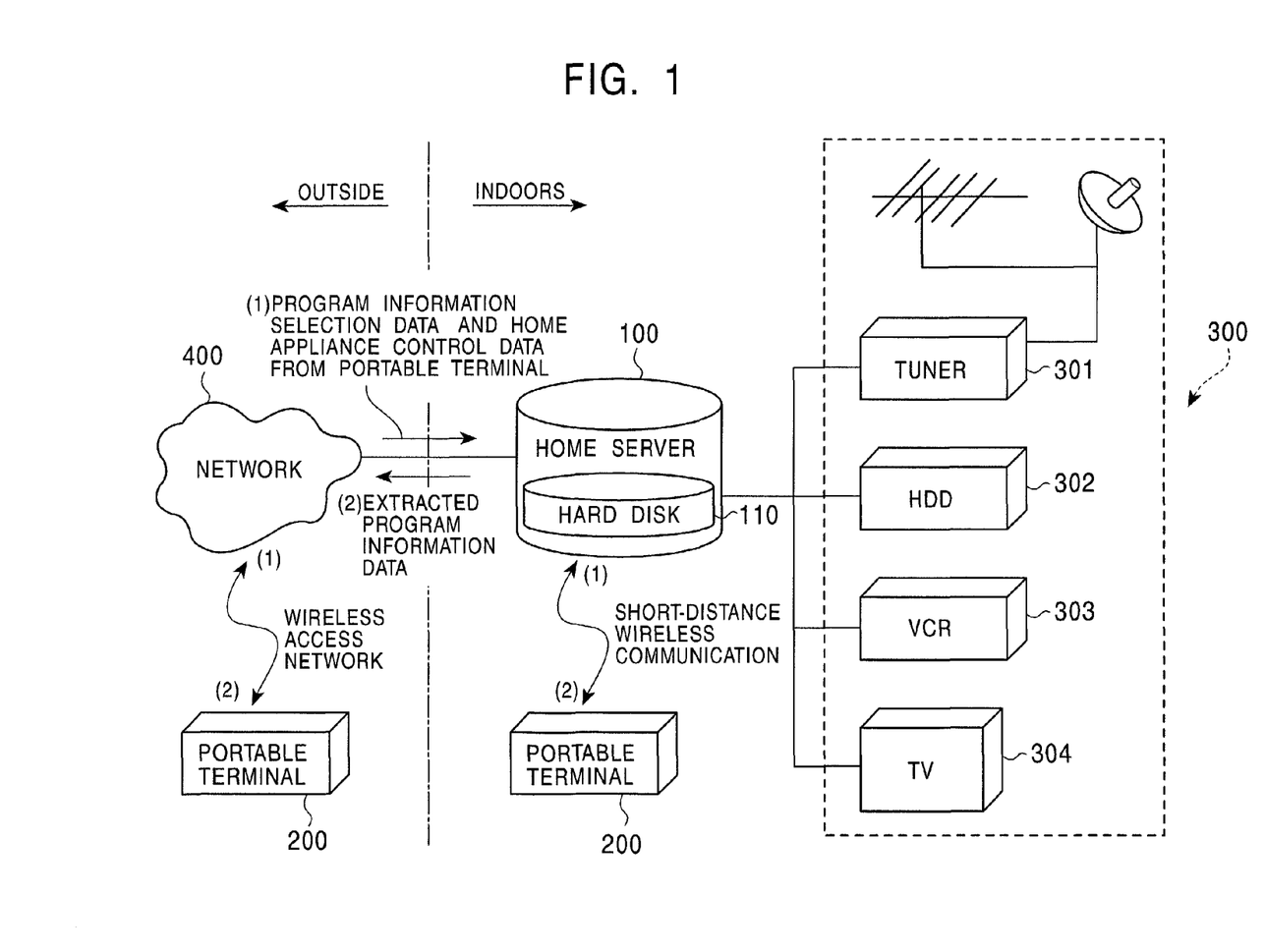
FIG. 1 is a schematic diagram of the overall structure of a broadcast program recording and playing apparatus according to an embodiment of the present invention.

Referring to FIG. 1, a device configuration diagram is shown. A home server 100 includes a database for storing broadcast program information. Portable terminals 200 receive the broadcast program information stored in the database using wireless communication. Home appliances 300 have functions of recording and playing broadcast programs. For example, the home appliances 300 include a tuner 301, an HDD 302, a VCR 303, and a television (TV) 304.

The home server 100 includes a program management unit for managing the database that stores program information for broadcast programs. The home server 100 also includes a hard disk 110 that obtains and stores broadcast program information from the Internet and digital broadcasting; an extraction unit (not shown) that extracts desired broadcast program information from the obtained broadcast program information; a communication unit (not shown) that communicates data with the portable terminals 200 through a network 400 such as a wireless access network; another communication unit (not shown) that communicates data with the portable terminals 200 using a short-distance wireless communication system such as Bluetooth, infrared data communication, and the like; a selector switch (not shown) for switching between the two communication units; and a control unit (not shown) that controls the home appliances 300 which are connected thereto by a daisy-chain or a bus.

The portable terminals 200 are electronic apparatuses that can receive program information stored in the database of the home server 100 by transmission units using wireless communication. The portable terminals 200 each include a communication unit for communicating data with the home server 100 through the network 400 such as the wireless access network; another communication unit for communicating data with the home server 100 using the short-distance wireless communication system such as Bluetooth, infrared data communication, and the like; a selector switch for switching between the two communication units; a unit for extracting individual broadcast program information from the home server 100 and displaying the extracted broadcast program information; and a selection unit for selecting the extracted broadcast program information.

Figure 2:
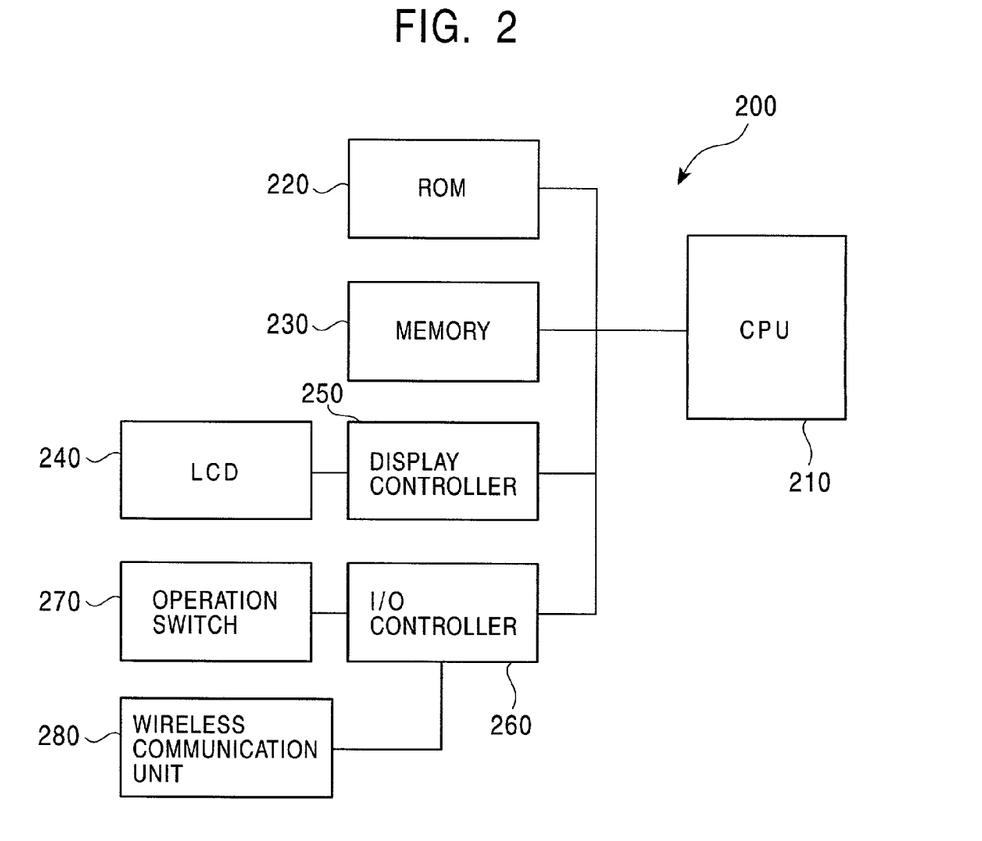
FIG. 2 is a block diagram of the structure of a portable terminal for recording and playing broadcast programs according to another embodiment of the present invention.

Referring to FIG. 2, the specific structure of the portable terminal 200 is shown. A central processing unit (CPU) 210 controls each section of the portable terminal 200. A read only memory (ROM) 220 stores a program for the CPU 210. In a memory 230, the program and data are expanded. A liquid crystal display (LCD) 240 displays data. A display controller 250 controls the LCD 240. An operation switch 270 selects displayed data and controls the home appliances 300 (see FIG. 1). A wireless communication unit 280 communicates with the home server 100 (see FIG. 1) indoors and outside. An input/output (I/O) controller 260 controls the operation switch 270 and the wireless communication unit 280.

The wireless communication unit 280 has a function of appropriately switching between communication using a public circuit based on a spread spectrum communication system and short-distance wireless communication based on the spread spectrum communication system. The wireless communication unit 280 includes a wireless transmitting section shown in FIG. 3 and a wireless receiving section shown in FIG. 4.

Figure 3:
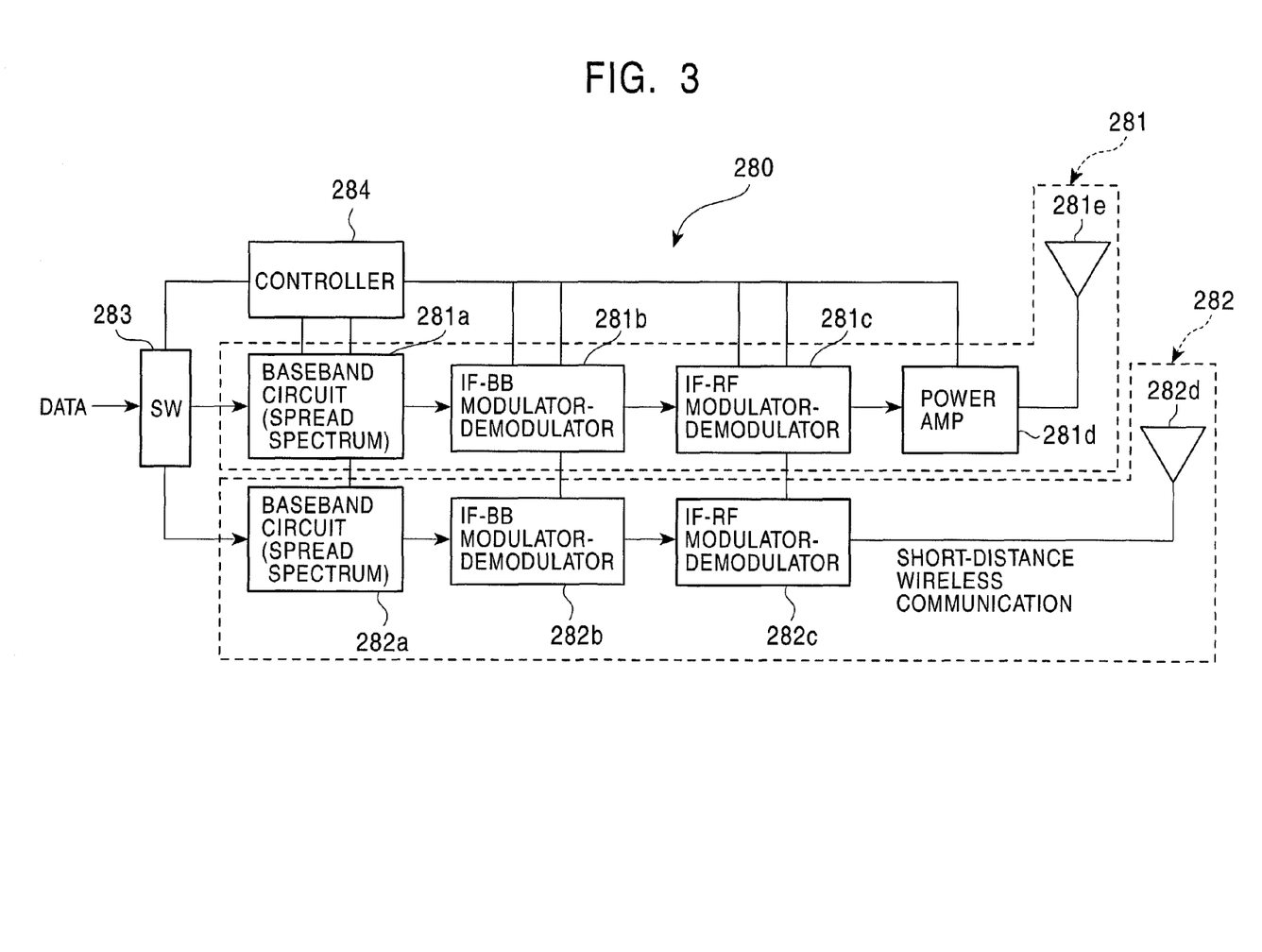
FIG. 3 is a block diagram of the structure of a wireless transmitting section of a wireless communication unit of the portable terminal for recording and playing broadcast programs.

Referring to FIG. 3, the wireless transmitting section includes a direct spectrum (DS) transmitter 281 that transmits data through the network 400 using the spread spectrum communication system. A frequency hopping (FH) transmitter 282 transmits data using short-distance wireless communication based on the spread spectrum communication system. A switch 283 switches between the DS transmitter 281 and the FH transmitter 282. A controller 284 controls the DS transmitter 281 and the FH transmitter 282.

The DS transmitter 281 is a transmitter for communicating, from the outside, with the home server 100 through the network 400 such as the wireless access network, which is the public circuit. The DS transmitter 281 includes a baseband circuit 281a that processes data using a spread spectrum system (direct spreading); an IF-BB modulator-demodulator 281b that converts a baseband signal obtained by the baseband circuit 281a into an intermediate frequency (IF) signal; an IF-RF modulator-demodulator 281c that converts the IF signal into a radio frequency (RF) signal; a power amplifier 281d that amplifies the RF data (signal) so that it transmits a signal at predetermined power; and a transmission antenna 281e.

The FH transmitter 282 is a short-distance wireless transmitter that communicates information with the home server 100, particularly indoors. The FH transmitter 282 includes a baseband circuit 282a that processes data using a spread spectrum system (frequency hopping); an IF-BB modulator-demodulator 282b that converts a baseband signal obtained by the baseband circuit 282a into an IF signal; an IF-RF modulator-demodulator 282c that converts the IF signal into an RF signal; and a transmission antenna 282d.

Figure 4:
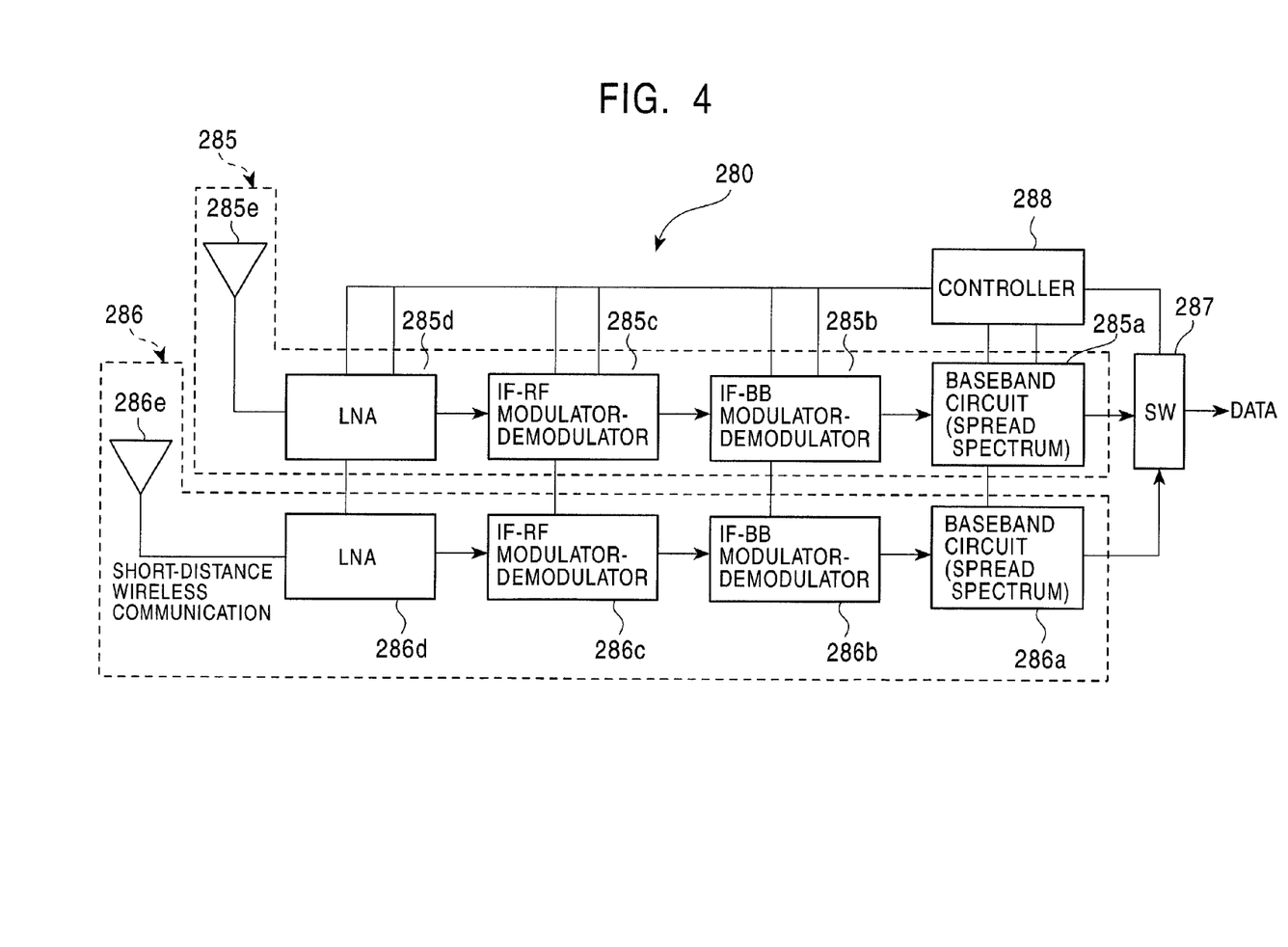
FIG. 4 is a block diagram of the structure of a wireless receiving section of the wireless communication unit of the portable terminal for recording and playing broadcast programs.

Referring to FIG. 4, the wireless receiving section is shown. The wireless receiving section includes a DS receiver 285 that receives data (signal) that has undergone spread spectrum processing via the network 400; an FH receiver 286 that receives data (signal) using short-distance wireless communication based on the spread spectrum communication system; a switch 287 that switches between the DS receiver 285 and the FH receiver 286; and a controller 288 that controls the DS receiver 285 and the FH receiver 286.

The DS receiver 285 is a receiver that communicates, from the outside, information with the home server 100 through the network such as the wireless access network, which is the public circuit. The DS receiver 285 includes a reception antenna 285e that receives data (signal) such as broadcast program information from the home server 100; a low noise amplifier (LNA) 285d that amplifies the received data (signal) such as the program information; an IF-RF modulator-demodulator 285c that converts an RF signal from the LNA 285d into an IF signal; an IF-BB modulator-demodulator 285b that converts the IF signal into a baseband signal; and a baseband circuit 285a that demodulates (de-spreads) the baseband signal.

The FH receiver 286 is a short-distance wireless receiver that communicates information with the home server 100 indoors. The FH receiver 286 includes a reception antenna 286e that receives data (signal) such as broadcast program information from the home server 100; an LNA 286d that amplifies the received data (signal) such as the program information; an IF-RF modulator-demodulator 286c that converts an RF signal from the LNA 286d into an IF signal: an IF-BB modulator-demodulator 286b that converts the IF signal into a baseband signal; and a baseband circuit 286a that demodulates (de-spreads) the baseband signal.

Referring back to FIG. 1, the home appliances 300 include the tuner 301 that receives broadcast programs such as digital broadcast programs and the like; the HDD 302 that records and stores data for the broadcast programs and the like; the VCR 303 that records and plays broadcast programs; and the TV 304 that displays received or recorded broadcast programs. The home appliances 300 are connected to the home server 100 by a daisy-chain or a bus. The home appliances 300 are controlled by the portable terminal 200 through the home server 100.

With the foregoing system configuration, the portable terminals 200, which are electronic apparatuses, operate indoors the home appliances 300 having functions of recording and playing broadcast programs. This case will be described with reference to the drawings.

Figure 5:
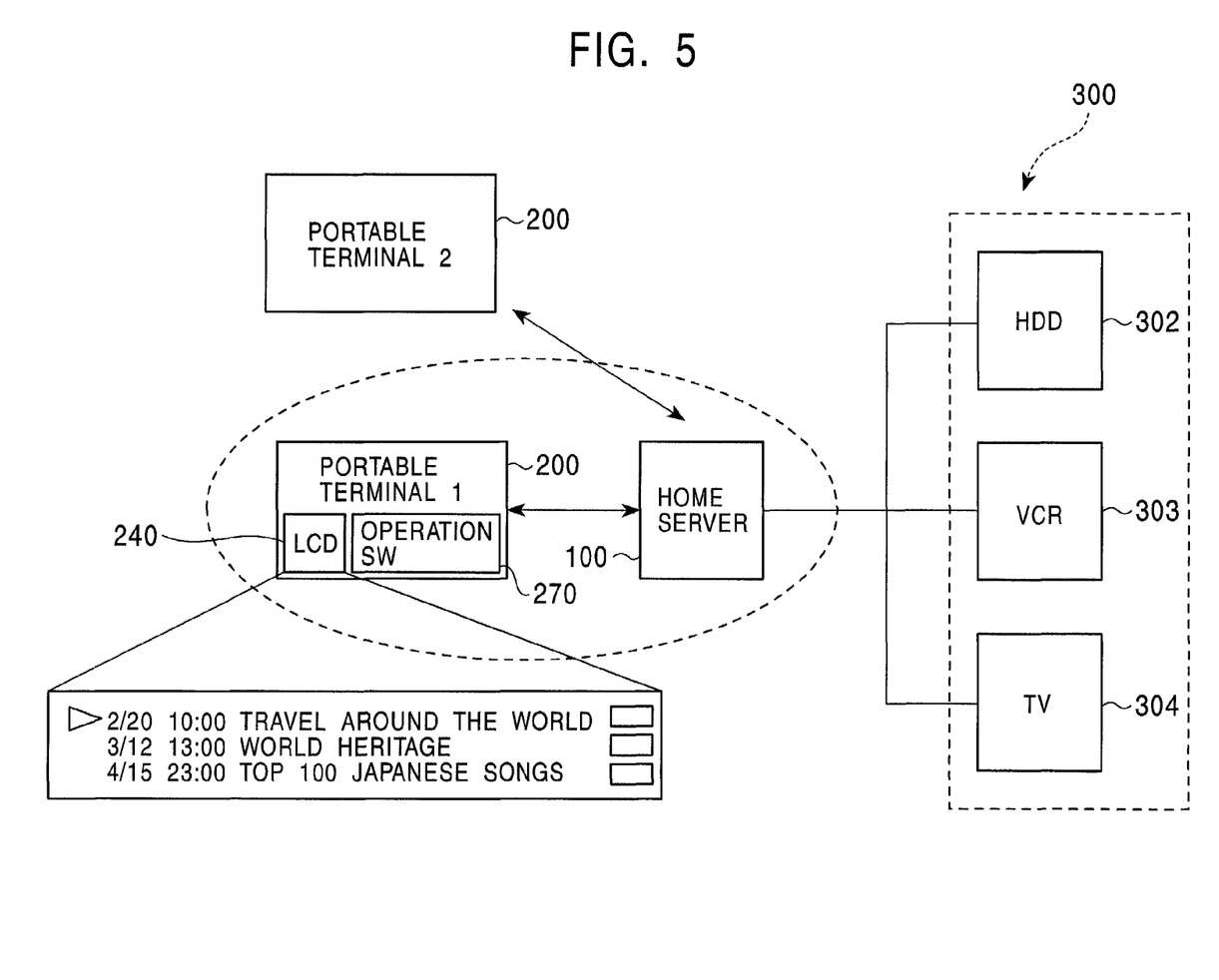
FIG. 5 illustrates a case in which home appliances are controlled by selecting broadcast program information from indoors or from outside by the broadcast program recording and playing apparatus using the portable terminal for recording and playing broadcast programs.

Referring to FIG. 5, the system includes the home server 100 shown in FIG. 1, the portable terminals 200 shown in FIG. 2, and the home appliances 300 including the HDD 302, the VCR 303, and the TV 304. The home appliances 300 are connected to the home server 100.

Broadcast program information is extracted in accordance with personal preferences from broadcast program information obtained from a network such as the Internet, and the extracted information is stored in a recording storage medium, such as the hard disk 110 (not shown in FIG. 5) in the home server 100. The home appliances 300 such as the VCR 303 and the like can record broadcast programs and receive desired broadcast programs from a server (not shown) that stores broadcast programs.

Figure 6:
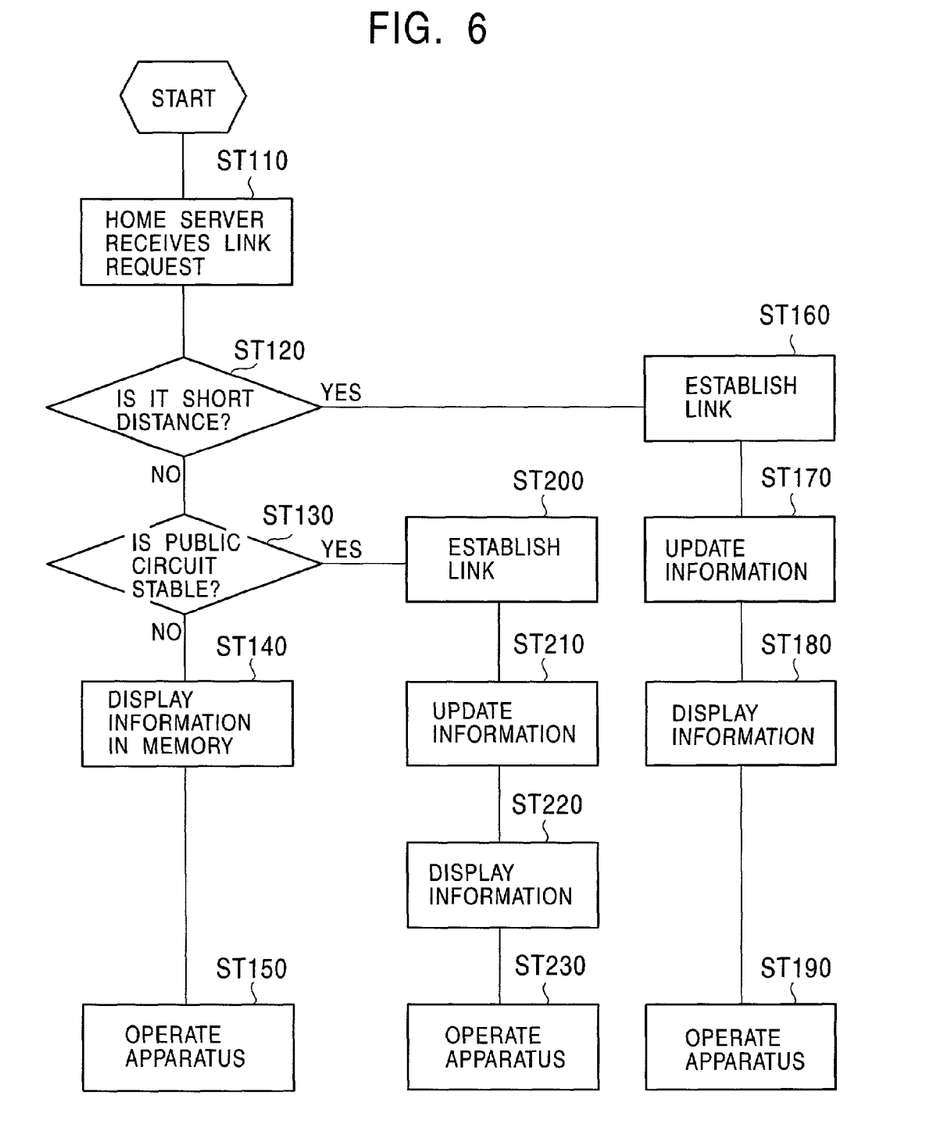
FIG. 6 is a flowchart showing a data communication process performed between the portable terminal and a home server.

FIG. 6 shows a flowchart of a data communication process performed between the home server 100 and the portable terminals 200.

The home server 100 is always waiting for the portable terminal 200 to establish a link (step ST110). When a user operates the operation switch 270 or the like, the portable terminal 200 transmits, from indoors or from outside, a request to establish a link with the home server 100. The home server 100 determines whether the link request from the portable terminal 200 is transmitted from indoors or from outside and operates so as to establish a link with the portable terminal 200 (steps ST120 and ST130). When the portable terminal 200 tries to establish a link from the outside using a public circuit, or when the link status between the portable terminal 200 and the home server 100 becomes unstable due to its environment or the like, the process displays information currently stored in a memory of the portable terminal 200 or an error message indicating that link establishment failed (step ST140), and the process starts operating the portable terminal 200 (step ST150).

When it is determined that the process performs short-distance wireless communication (step ST120), the home server 100 establishes a link with the portable terminal 200 (step ST160). The home server 100 transmits the user's most recent individual broadcast program information stored in the recording storage medium to the portable terminal 200 (step ST170). The LCD 240 of the portable terminal 200 displays the broadcast program information transmitted from the home server 100 (step ST180). The user operates the operation switch 270 of the portable terminal 200 to select desired broadcast program information (step ST190).

When it is determined that the process performs data communication using a public circuit (step ST130), the home server 100 establishes a link with the portable terminal 200 (step ST200). The home server 100 transmits the user's most recent individual broadcast program information stored in the recording storage medium to the portable terminal 200 (step ST210). The LCD 240 of the portable terminal 200 displays the broadcast program information transmitted from the home server 100 (step ST220). The user operates the operation switch 270 of the portable terminal 200 to select the desired broadcast program information (step ST230).

In this manner, under the control of the portable terminal 200, the home server 100 and the portable terminal 200 can play or set up recording of a desired broadcast program.

Figure 7:
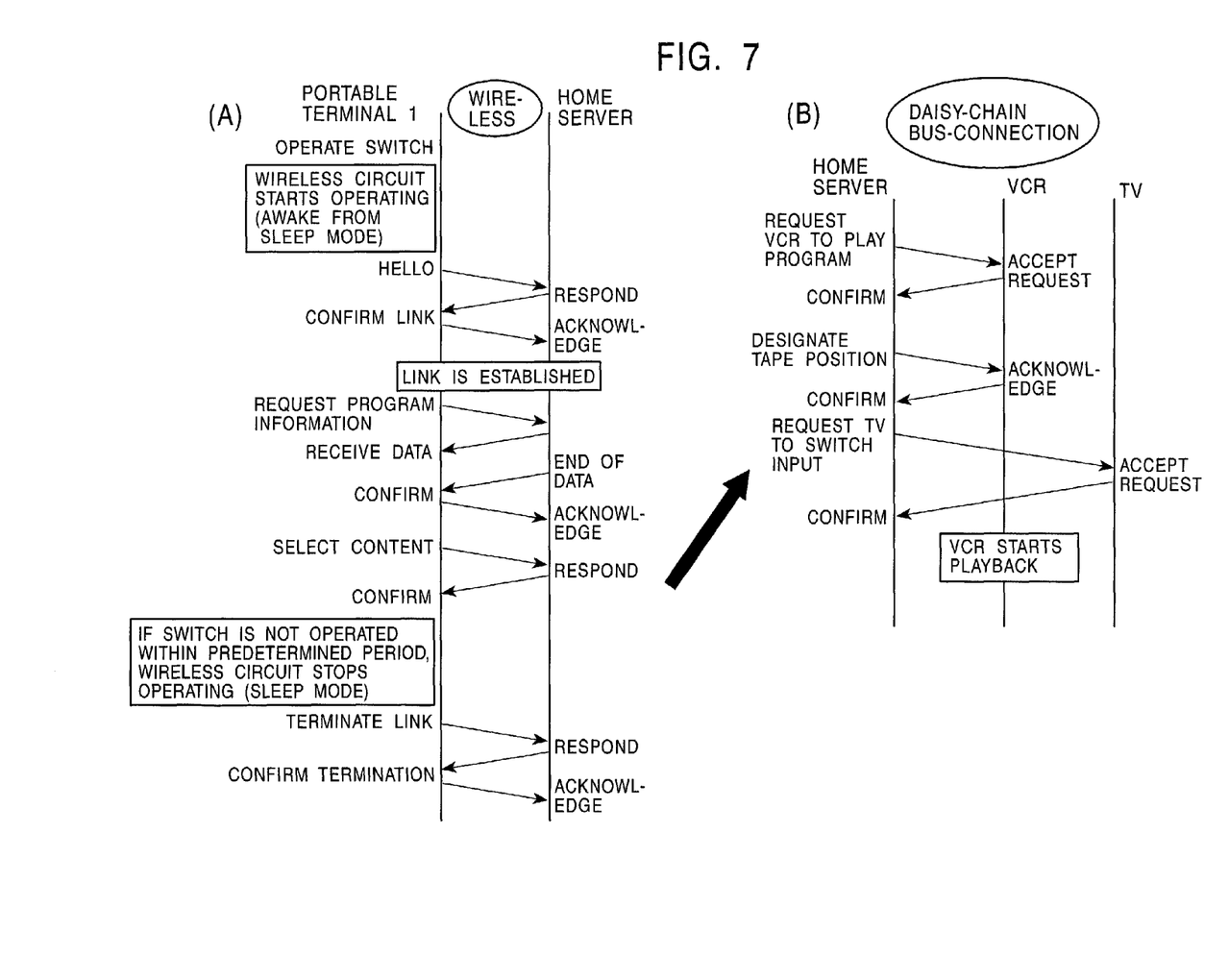
FIG. 7 illustrates the communication procedure between the portable terminal and the home server and that between the home server and home appliances (VCR and TV).

Referring to FIGS. 5 and 7, the portable terminal 200 establishes, from indoors, a link with the home server 100 and selects and plays the desired broadcast program information (content). FIG. 5 shows the system configuration, and FIG. 7 shows a communication procedure (protocol).

The portable terminal 200 establishes a link with the home server 100, and a user obtains individual broadcast program information and selects desired broadcast program information. FIG. 7(A) shows a process performed between the portable terminal 200 and the home server 100. The home server 100 is always waiting for the portable terminal 200 to establish a link therewith. The user selects indoors/outside using the operation switch 270 of the portable terminal 200. Referring to FIG. 5, the process switches to short-distance wireless communication and transmits a link request (HELLO) to the home server 100. When the home server 100 receives the link request, the home server 100 performs link establishment processing and transmits a response to the portable terminal 200. The portable terminal 200 confirms the link establishment and transmits a confirmation signal to the home server 100. The home server 100 acknowledges that the portable terminal 200 has confirmed the link establishment. Accordingly, the link for performing mutual data communication is established.

When the mutual link is established, the portable terminal 200 requests individual broadcast program information stored in the home server 100. In response to the request, the home server 100 transmits the individual broadcast program information stored in the recording storage medium to the portable terminal 200. The portable terminal 200 in turn confirms that reception of the entire broadcast program information is completed and transmits a confirmation signal to the home server 100. The home server 100 acknowledges the confirmation signal from the portable terminal 200. Accordingly, the portable terminal 200 obtains the individual broadcast program information stored in the home server 100.

Having obtained the individual broadcast program information, the portable terminal 200 causes the LCD 240 to display the titles of broadcast programs and the like. The user operates the operation switch 270 to select desired broadcast program information (content) (see FIG. 5). Selection information for the broadcast program information selected by the user is transmitted to the home server 100. The home server 100 receives the selection information for the selected broadcast program information and transmits a confirmation response to the portable terminal 200. The portable terminal 200 receives the response from the home server 100 and confirms that the selection of the broadcast program information is completed.

When the selection of the broadcast program information is completed, the portable terminal 200 terminates the link with the home server 100. When the operation switch 270 is not operated for a predetermined period of time, the portable terminal 200 transmits a link terminating signal to the home server 100. When the home server 100 receives the link terminating signal, the home server 100 terminates the link and transmits a response to the portable terminal 200. The portable terminal 200 confirms that the link is terminated and transmits a confirmation signal to the home server 100. The home server receives the confirmation signal and acknowledges that the link with the portable terminal 200 is terminated. Accordingly, data communication between the home server 100 and the portable terminal 200 is terminated.

Based on the selected broadcast program information, the home server 100 determines whether the selected information indicates an already recorded broadcast program or a broadcast program yet to be recorded. Then, the home server 100 selects an appropriate apparatus from among the home appliances 300 and gives an instruction to the selected apparatus. For example, as shown in FIG. 7(B), when the selected broadcast program information indicates a broadcast program that is already recorded by the VCR 303, the home server 100 transmits an activation request to the VCR 303 to play a predetermined broadcast program. The VCR 303 receives the activation request from the home server 100 and transmits an acceptance (or refusal) signal in response to the activation request to the home server 100. The home server 100 confirms that the request has been accepted (or refused) based on the signal from the VCR 303. The home server 100 transmits information and designates the start position of a tape inserted in the VCR 303 at which a desired broadcast program is recorded. In response to the designation (playback start position) from the home server 100, the VCR 303 prepares for playing in accordance with the designation and transmits an acknowledgement to the home server 100. The home server 100 confirms the acknowledgement from the VCR 303. Accordingly, the VCR 303 is ready to play the program.

Subsequently, the home server 100 requests the TV 304 for displaying images from the VCR 303 to switch input so that the TV 304 can play signals from the VCR 303. The TV 304 receives the input switch request and transmits an acceptance signal to the home server 100. The home server 100 in turn confirms the acceptance from the TV 304. In response to an instruction from the home server 100, the VCR 303 starts playing the desired broadcast program, and the TV 304 projects images of the desired broadcast program.

What is claimed is:

1. A program processing apparatus comprising:
 a transmission unit that transmits program information stored in a database to one of a plurality of electronic apparatuses using wireless communication, wherein the transmitted program information is a user's most recent individual program information;
 where the program processing apparatus extracts the program information for programs in accordance with personal preferences manages the database that stores the extracted program information for programs, and controls a plurality of program recording and playing apparatuses in accordance with received selection information, the plurality of program recording and playing apparatuses including a hard disk device, a video recorder, and a television that are connected with the program processing apparatus by a daisy-chain;

a determination unit that determines whether the selection information indicates information that has been recorded previously by one of the plurality of programs recording and playing apparatuses and determining which one of the plurality of programs recording and playing apparatuses the information is recorded on, and for designating a point for which to begin playback as a function of the selection information when the determination unit determines the information has been recorded previously and determines which one of the programs recording and playing apparatuses the information is recorded on, wherein the plurality of electronic apparatus control the plurality of programs recording and playing apparatus through the program processing apparatus, wherein a user of one of the plurality of electronic apparatus chooses whether the user is indoor or outside by operating an operation switch and sends to the program processing apparatus a link request indicating whether the user is indoor or outside, wherein the plurality of programs recording and playing apparatus prepares for playing in accordance with the designation and transmits an acknowledgement, and wherein, when the acknowledgement is confirmed, playback is ready to begin; and a switching unit that switches a wireless communication unit between communication using a public circuit based on a spread spectrum communication system and short-distance wireless communication based on the spread spectrum communication system; and wherein the switching unit determines whether to display program information from a memory of the requesting electronic apparatus, as a function of, (1) whether a request to link from one of the plurality of electronic apparatuses is from indoors or from outside, and (2) whether the link is unstable, wherein when it is determined that data communication is performed by short-distance wireless communication and when it is determined that data communication is performed using a public circuit, a link is established with a portable electronic apparatus and most recent individual broadcast program information data is transmitted to the electronic apparatus and broadcast program information is displayed on a viewing screen of the electronic apparatus, wherein a user of the portable electronic apparatus operates an operation switch to select desired broadcast program information, wherein selection information for the desired broadcast program information selected by the user is transmitted, a confirmation receipt is received, and confirms the selection of the desired broadcast program information, wherein when the selection of the broadcast program information is completed, the link is terminated, wherein the program processing apparatus receives a termination request sent from the one of the plurality of electronic apparatus and terminates the link between the program processing apparatus and the one of the electronic apparatus when an operation switch of the one of the electronic apparatus is not operated for a predetermined period of time.

2. A program processing apparatus according to claim 1, wherein said plurality of electronic apparatus further comprises a portable terminal.

3. A program processing apparatus according to claim 2, wherein said portable terminal comprises a private apparatus.

4. A program processing apparatus according to claim 1, wherein the programs recording and playing apparatus comprises an audio apparatus or a video apparatus.

5. A program processing apparatus according to claim 1, wherein the wireless communication with said electronic apparatus is switched between communication using a public circuit and short-distance wireless communication.

6. A program processing apparatus according to claim 5, wherein the short-distance wireless communication is based on the Bluetooth system.

7. A program processing apparatus according to claim 5, wherein the short-distance wireless communication is based on an infrared data communication system.

8. A portable terminal for recording and playing programs, comprising:

a transmission unit that transmits program information stored in a database that stores the program information for programs to one of a plurality of electronic apparatuses using wireless communication, wherein the program information stored in the database is extracted in accordance with personal preferences, and wherein the transmitted program information is a user's most recent individual program information;

a display unit that displays the program information obtained using said transmission unit;

a command transmission unit that transmits a command that controls a plurality of programs recording and playing apparatuses to a server that controls recording and playing performed by the programs recording and playing apparatuses, the plurality of program recording and playing apparatuses including a hard disk device, a video recorder, and a television that are connected with the server by a daisy-chain;

wherein whether the selection information indicates information that has been recorded previously by one of the plurality of programs recording and playing apparatuses is determined and which one of the plurality of programs recording and playing apparatuses the information is recorded on is determined, and wherein a point is designated for which to begin playback as a function of the command when the information has been recorded previously, and wherein a user of the portable terminal chooses whether the user is indoor or outside by operating an operation switch and sends to the server a link request indicating whether the user is indoor or outside, wherein the portable terminal controls the plurality of programs recording and playing apparatus through the server, wherein the determined programs recording and playing apparatus prepares for playing in accordance with the designation and transmits an acknowledgement, and wherein, when the acknowledgement is confirmed, playback is ready to begin; and a switching unit that switches a wireless communication unit between communication using a public circuit based on a spread spectrum communication system and short-distance wireless communication based on the spread spectrum communication system; and wherein the switching unit determines whether to display program information from a memory of the requesting electronic apparatus, as a function of whether a request to link from one of the plurality of electronic apparatuses is from indoors or from outside and whether the link is unstable, wherein when it is determined that data communication is performed by short-distance wireless communication and when it is determined that data communication is performed using a public circuit, a link is established with a portable electronic apparatus and most recent individual broadcast program information data is transmitted to the electronic apparatus and broadcast program information is displayed on a viewing screen of the electronic apparatus, wherein a user of the portable electronic apparatus operates an operation switch to select desired broadcast program information, wherein selection information for the desired broadcast program information selected by the user is transmitted, a confirmation receipt is received, and confirms the selection of the desired broadcast program information, wherein when the selection of the broadcast program information is completed, the link is terminated, wherein the portable terminal sends a termination request to the one of the plurality of electronic apparatus to terminate the link between the portable terminal and the one of the electronic apparatus when an operation switch of the portable terminal is not operated for a predetermined period of time.

9. A portable terminal for recording and playing programs according to claim 8, wherein said portable terminal is a feature of the electronic apparatus using wireless communication.

10. A portable terminal for recording and playing programs according to claim 9, wherein said portable terminal comprises a private apparatus.

11. A portable terminal for recording and playing programs according to claim 8, wherein the programs recording and playing apparatus comprises an audio apparatus or a video apparatus.

12. A portable terminal for recording and playing programs according to claim 8, wherein the wireless communication with said electronic apparatus is switched between communication using a public circuit and short-distance wireless communication.

13. A portable terminal for recording and playing programs according to claim 12, wherein the short-distance wireless communication is based on the Bluetooth system.

14. A portable terminal for recording and playing programs according to claim 12, wherein the short-distance wireless communication is based on an infrared data communication system.

15. A program processing method executed by a program processing apparatus, comprising:
extracting program information for programs in accordance with personal preferences,
managing a database that stores the extracted program information for programs;
transmitting the program information stored in the database to one of a plurality of electronic apparatuses using wireless communication,
wherein the transmitted program information is a user's most recent individual program information;
determining whether a request to link is from indoors or from outside;
determining whether the link is unstable;
determining whether to display program information from a memory of a portable device as a function of the request to link and the determination of whether the link is unstable;
controlling a plurality of programs recording and playing apparatus in accordance with received selection information;
determining whether the selection information indicates information that has been recorded previously by one of the plurality of electronic apparatuses and determining which one of the plurality of electronic apparatuses the information is recorded on;
designating a point for which to begin playback as a function of the selection information when determining the selection information indicates information that has been recorded previously by one of the plurality of electronic apparatuses and when determining which one of the plurality of electronic apparatuses the information is recorded on;
transmitting an acknowledgement, such that when the acknowledgement is confirmed, playback is ready to begin; and
switching a wireless communication unit between communication using a public circuit based on a spread spectrum communication system and short-distance wireless communication based on the spread spectrum communication system, and
receiving a termination request sent from the one of the plurality of electronic apparatus and terminating the link between the program processing apparatus and the one of the electronic apparatus when an operation switch of the one of the electronic apparatus is not operated for a predetermined period of time,
wherein a user of one of the plurality of electronic apparatus chooses whether the user is indoor or outside by operating an operation switch and sends to the program processing apparatus a link request indicating whether the user is indoor or outside, and
wherein when it is determined that data communication is performed by short-distance wireless communication and when it is determined that data communication is performed using a public circuit, a link is established with a portable electronic apparatus and most recent individual broadcast program information data is transmitted to the electronic apparatus and broadcast program information is displayed on a viewing screen of the electronic apparatus,
wherein a user of the portable electronic apparatus operates an operation switch to select desired broadcast program information,
wherein selection information for the desired broadcast program information selected by the user is transmitted, a confirmation receipt is received, and confirms the selection of the desired broadcast program information,
wherein when the selection of the broadcast program information is completed, the link is terminated,
wherein the plurality of electronic apparatus control the plurality of programs recording and playing apparatus through the program processing apparatus, and
wherein, the plurality of program recording and playing apparatuses include a hard disk device, a video recorder, and a television that are connected with the program processing apparatus by a daisy-chain.

16. A method, executed by a portable terminal, for processing programs, comprising:
transmitting program information stored in a database that stores the program information for programs to one of a plurality of electronic apparatuses using wireless communication,
wherein the program information stored in the database is extracted in accordance with personal preferences, and wherein the transmitted program information is a user's most recent individual program information;
determining whether a request to link is from indoors or from outside;
determining whether the link is unstable;
determining whether to display program information from a memory of a portable device as a function of the request to link and the determination of whether the link is unstable;
displaying the program information obtained;
transmitting a command that controls a plurality of programs recording and playing apparatus to a server that controls recording and playing performed by the plurality of recording and playing apparatuses;
determining whether the selection information indicates information that has been recorded previously by one of the plurality of electronic apparatuses and determining which one of the plurality of electronic apparatuses the information is recorded on;
designating a point for which to begin playback as a function of the selection information when determining the selection information indicates information that has been recorded previously by one of the plurality of electronic apparatuses and when determining which one of the plurality of electronic apparatuses the information is recorded on;
preparing the determined electronic apparatus for playing in accordance with the designation;
transmitting an acknowledgement such that when the acknowledgement is confirmed, playback is ready to begin; and
switching a wireless communication unit between communication using a public circuit based on a spread spectrum communication system and short-distance wireless communication based on the spread spectrum communication systems, and
transmitting a termination request to the one of the plurality of electronic apparatus to terminate the link between the portable terminal and the one of the electronic apparatus when an operation switch of the portable terminal is not operated for a predetermined period of time,
wherein a user the portable terminal chooses whether the user is indoor or outside by operating an operation switch and sends to the server a link request indicating whether the user is indoor or outside,
wherein when it is determined that data communication is performed by short-distance wireless communication and when it is determined that data communication is performed using a public circuit, a link is established with a portable electronic apparatus and most recent individual broadcast program information data is transmitted to the electronic apparatus and broadcast program information is displayed on a viewing screen of the electronic apparatus,
wherein a user of the portable electronic apparatus operates an operation switch to select desired broadcast program information,
wherein selection information for the desired broadcast program information selected by the user is transmitted, a confirmation receipt is received, and confirms the selection of the desired broadcast program information,
wherein when the selection of the broadcast program information is completed, the link is terminated,
wherein the portable terminal controls the plurality of programs recording and playing apparatus through the server, and
wherein the plurality of program recording and playing apparatuses include a hard disk device, a video recorder, and a television that are connected with the server by a daisy-chain.

* * * * *